(12) United States Patent
Groetzner et al.

(10) Patent No.: US 7,434,225 B2
(45) Date of Patent: Oct. 7, 2008

(54) CONTEXT INFORMATION ASSOCIATED WITH MESSAGE FLOWS IN A MESSAGING SYSTEM

(75) Inventors: Michael Groetzner, Stuttgart (DE); Harry Hoff, Gaertringen (DE)

(73) Assignee: International Business Machines Corporation, Armonk, NY (US)

(*) Notice: Subject to any disclaimer, the term of this patent is extended or adjusted under 35 U.S.C. 154(b) by 670 days.

(21) Appl. No.: 10/904,627

(22) Filed: Nov. 19, 2004

(65) Prior Publication Data

US 2005/0138632 A1 Jun. 23, 2005

(30) Foreign Application Priority Data

Dec. 18, 2003 (EP) .................... 03104807

(51) Int. Cl.
*G06F 9/44* (2006.01)
*G06F 3/00* (2006.01)
*G06F 15/16* (2006.01)
*G06Q 40/00* (2006.01)
*H04K 1/00* (2006.01)

(52) U.S. Cl. ............... 719/313; 715/760; 709/206; 709/207; 705/42; 705/68; 705/70

(58) Field of Classification Search ........... 705/42, 705/68, 70; 707/1–5, 10; 709/201–207, 709/217–219; 715/513–515, 760; 719/313–315
See application file for complete search history.

(56) References Cited

U.S. PATENT DOCUMENTS

| | | | |
|---|---|---|---|
| 6,836,890 B1 * | 12/2004 | Watts, Jr. et al. | 719/313 |
| 2002/0083210 A1 * | 6/2002 | Harrison et al. | 709/310 |
| 2002/0141449 A1 * | 10/2002 | Johnson | 370/473 |
| 2005/0049924 A1 * | 3/2005 | DeBettencourt et al. | 705/21 |

* cited by examiner

*Primary Examiner*—Thomas Lee
*Assistant Examiner*—Charles E Anya
(74) *Attorney, Agent, or Firm*—David Irvin; Winstead PC (57) ABSTRACT

Method, parser, messaging system, computer program and computer program product for handling context information associated with a message flow in a messaging system, the message flow having processing nodes for processing the message. A request is received at the parser to perform a first operation associated with the message. An indication of the context information to retrieve from a context store is obtained. This context information is for use by at least one of the processing nodes in the message flow for determining how to process the message. The context information is retrieved from the context store and a logical representation of the context information is then created in a format accessible by at least one processing node in the message flow.

7 Claims, 9 Drawing Sheets

CONTEXT INFORMATION ASSOCIATED WITH MESSAGE FLOWS IN A MESSAGING SYSTEM

FIELD OF THE INVENTION

The present invention relates to the field of messaging systems, and more particularly to the processing of messages within such a system.

BACKGROUND

Asynchronous transfer of messages between application programs running different data processing systems within a network is well known in the art, and is implemented by a number of commercially available messaging systems. These systems include IBM Corporation's WebSphere® MQ family of messaging products, which use asynchronous messaging via queues. A sender application program issues a PutMessage command to send (put) a message to a target queue, and a queue manager handles the complexities of transferring the message from the sender to the target queue, which may be remotely located across a heterogeneous computer network. A message broker may of course process a received message prior to the transferring the message. (IBM and WebSphere are trademarks of International Business Machines Corporation).

Figure 1:
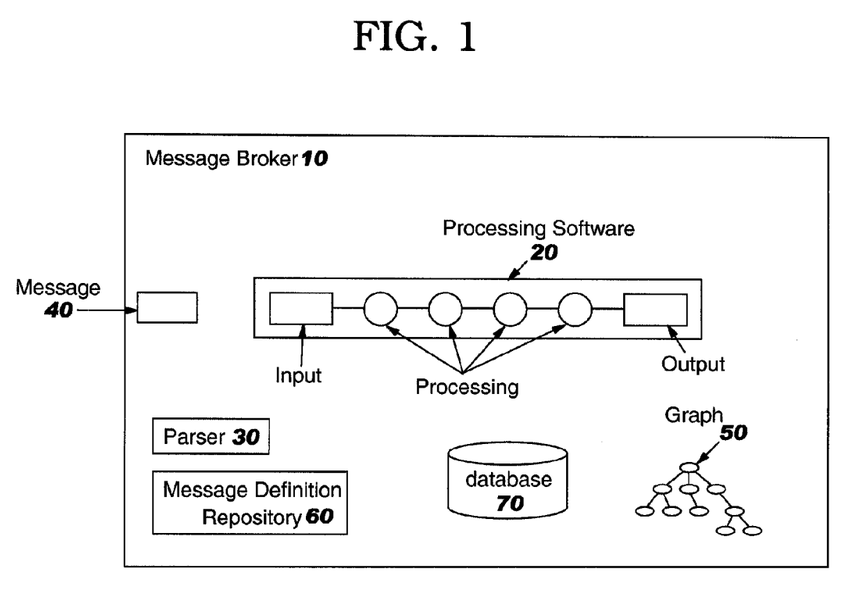
FIG. 1 illustrates the receipt and processing of a message by a prior art messaging system.

The receipt and processing of a message by a typical messaging system is illustrated in FIG. 1.

For a message broker 10 to be able to process a message 40, it is necessary for processing software 20 within the broker to access parts of that message. Messages are accessed and processed as a series of actions, represented as nodes (execution units), on the message to either route the message to further processing steps or to put data into or get data out of the message. This series of actions is typically known as a message flow and may comprise input, output and also processing nodes such as compute and transformation nodes.

Before the message can be accessed and processed by such a message flow, however, the content of the message must be in an accessible format. Products such as WebSphere MQ Integrator Broker provide a logical, abstract layer for accessing the content of a message and for converting the physical representation of the message into a logical view suitable for processing by the message flow. This physical to logical conversion is typically done by a message parser(s) 30 (one shown), which retrieves a part of the message and then interprets its content. In most cases, the interpretation is based on a message structure definition from a message definition repository 60. The output of the conversion process is a logical representation (e.g. a graph or tree structure 50 comprising a plurality of nodes) representing each part of the message.

Using the graph 50, processing nodes of a message flow may for example access parts of a message to extract values therefrom in order to update a local database 70.

Figure 2:
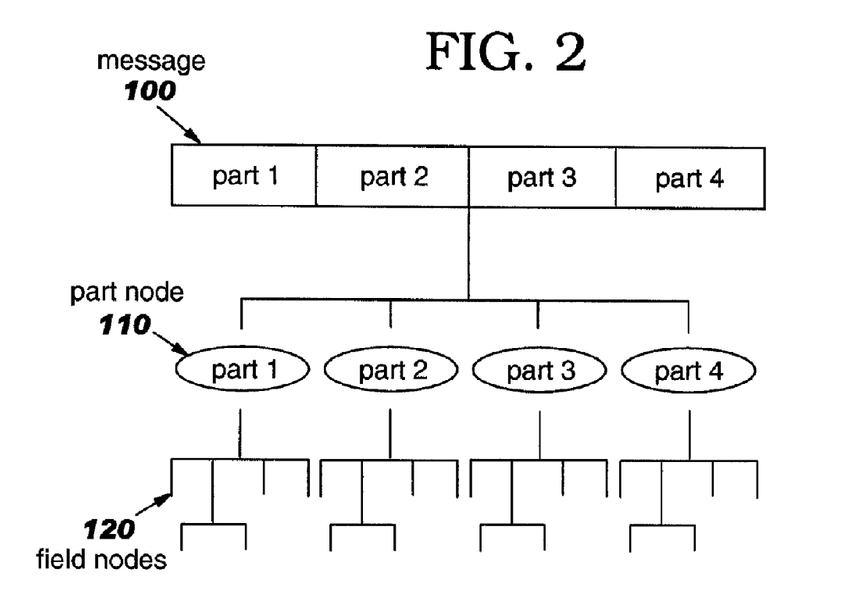
FIG. 2 shows a prior art message graph structure.

FIG. 2 illustrates the graph structure 50 in more detail.

A message 100 typically comprises multiple parts (e.g. parts 1, 2, 3 and 4) and each part typically comprises multiple fields. By way of example, parts 1 and 2 may include header information, whilst parts 3 and 4 may include business information.

A different parser is typically responsible for extracting the relevant information from each part and for converting this information into a graph structure.

Each message part is represented in the graph structure as a part node 110. Below each part node, there are a plurality of field nodes 120 representing the information stored within each message part.

In many cases, the information in the simple graph structure illustrated is not enough. Frequently the processing of a message needs some additional context information, e.g. configuration information that allows a customer to dynamically influence the processing of a message, or directory information that is required to check validity of a message. Such context information is typically stored within a context store associated with the messaging system and is used by the appropriate message flow to determine how the message should be processed. In most cases, this information must not be modified by the message flow.

To get such context information into the message flow when needed, there are currently a number of possible solutions.

Solution 1: At any time when context information is required by the messaging flow, a processing node in the message flow retrieves the necessary information from the context store. Thus, in this solution, processing nodes in the flow are provided with the functionality necessary to retrieve the appropriate context information. Having retrieved the appropriate context information, the subsequent processing in the node can then perform the required operation using the retrieved information—e.g. comparing the information with parts of the message or inserting the context information into the message. Using this method, the information is always retrieved when needed and is therefore up-to-date. The disadvantage is that when the same context information is needed by different nodes in the message flow, the same information must be retrieved multiple times.

Solution 2: Another solution is to use a processing node in the message flow that retrieves the information from the context store and adds this information to the message. In this way, the information is passed to subsequent processing nodes in the message flow such that they too can access the information when needed for the processing of the message in question.

The method of solution 2 is advantageous since the information need be retrieved only once, even if it is needed multiple times in multiple nodes in the message flow or for the processing of multiple messages. The context information is held by the processing node in its physical form in a cache and added in its logical form into every appropriate message. Further, this solution is advantageous because the context information is consistent within the execution of one message.

Figure 3:
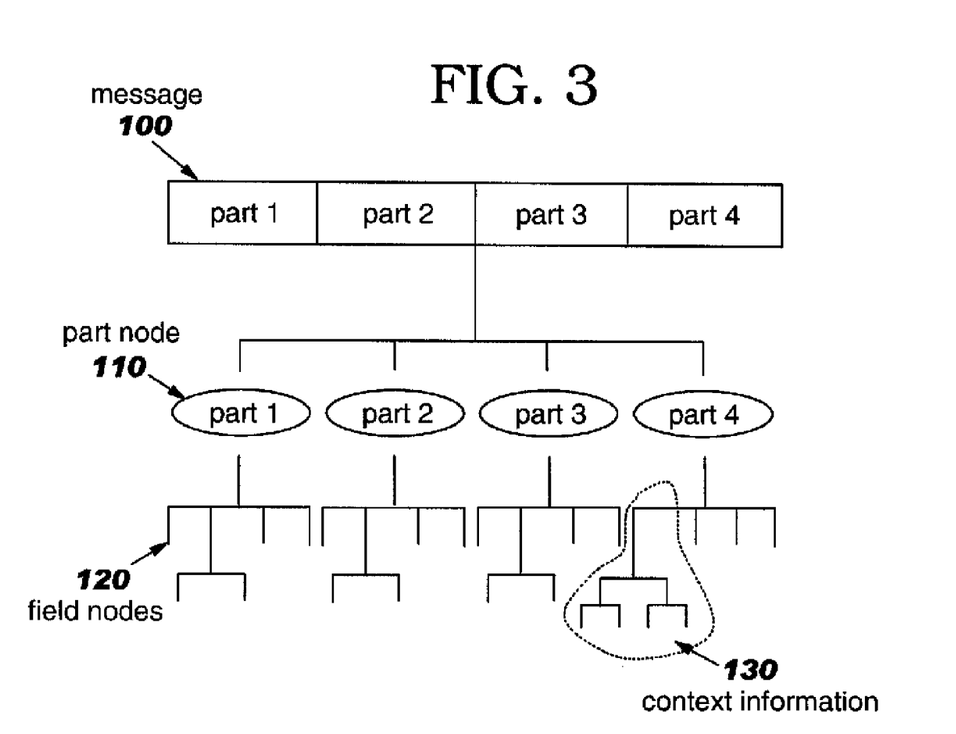
FIG. 3 shows a prior art message graph structure including context information.

FIG. 3 illustrates, in accordance with the prior art, a message graph including retrieved context information. When context information is needed by a processing node within a message flow, the appropriate information is extracted from the context store and the logical view of the message is augmented with this context information. This is shown in FIG. 3 as element 130 (apart from element 130, it will be appreciated that FIGS. 2 and 3 are identical.)

The disadvantage of this method is that the message flow is modified (at runtime), as is the message itself. Once a message flow has processed a message, each parser streams the logical view of its part of the message back into a physical representation. Since the logical view of the message has been modified, the physical view as re-constructed by the appropriate parsers will also have changed.

SUMMARY

According to a first aspect, there is provided a method for a parser to handle context information associated with a message flow in a messaging system, the message flow having processing nodes for processing the message, the method comprising: receiving at the parser a request to perform a first operation associated with the message (e.g. to parse the part of the message for which it is responsible); obtaining an indication of context information to retrieve from a context store, said context information for use by at least one of the processing nodes in the message flow for determining how to process the message; retrieving the context information from the context store; and creating a logical representation of the context information in a format accessible by at least one processing node in the message flow.

In this way, the message flow is not modified in order to retrieve appropriate context information.

Preferably the context information is in a format accessible by any processing node in the message flow. Thus because the same information is accessible by any of the processing nodes in the message flow, the information is consistent across such processing nodes.

In a preferred embodiment at least a part of the message has also been parsed into a logical representation accessible by processing nodes in the message flow. Preferably a request is received at the parser to perform a second operation associated with the message (e.g. to reconstruct the part of the message for which it is responsible into a physical form), the message having been processed by at least part of the message flow, Then, in accordance with the preferred embodiment the logical representation of context information associated with the processing of said message is ignored. The logical representation of the context information preferably co-exists with the logical representation of a least part of that message.

Thus, the message itself is not augmented with the context information.

In a preferred embodiment, if a subsequent parser exists, then the parser may invoke the subsequent parser in order that the subsequent parser can convert a logical representation of the part of the message for which it is responsible, into a physical representation. Note, however, that the reconstructed message may be a modified version of the original message that was received.

In one embodiment, in order to obtain an indication of the context information to retrieve, a determination is made as to which message flow is processing the message. Then, in accordance with this embodiment, the context information is retrieved using an identifier associated with the determined message flow.

In another embodiment, in order to obtain an indication of the context information to retrieve, at least a part of the message is accessed. In this embodiment, information obtained in accessing the message is then used to retrieve appropriate context information.

Preferably, the logical representation of the context information is added into the logical representation representing at least a part of the message. Of course this does not have to be the case. For example, the logical representation of the message itself may be kept separate from the logical representation of the context information. Even the logical representation of the message may comprise a number of separate logical representations—for example, each part of the message may be represented by a separate logical part.

In a preferred embodiment, it is possible to verify that the context information is consistent with another copy of the context information (e.g. a copy of the context information stored in a cache). The context information preferably does not change very often.

If the information is not consistent, then an error is preferably reported. Thus, an administrator is made aware that there is a potential problem with, for example, the message flow modifying context information when it should not be. Another option is to make the cache read-only.

According to another aspect, there is provided a parser for handling context information associated with a message flow in a messaging system, the message flow having processing nodes for processing the message, the parser comprising: means for receiving a request to perform a first operation associated with the message; means for obtaining an indication of context information to retrieve from a context store, said context information for use by at least one of the processing nodes in the message flow for determining how to process the message; means for retrieving the context information from the context store; and means for creating a logical representation of the context information in a format accessible by at least one processing node in the message flow.

According to another aspect, there is provided a messaging system comprising: a queue for receiving a message; a message flow having processing nodes for processing a received message; a parser; and means for invoking the parser, the parser comprising: means for receiving a request to perform a first operation associated with the message; means for obtaining an indication of context information to retrieve from a context store, said context information for use by at least one of the processing nodes in the message flow for determining how to process the message; means for retrieving the context information from the context store; and means for creating a logical representation of the context information in a format accessible by at least one processing node in the message flow.

According to another aspect, there is provided a method for a parser to handle context information associated with a message flow in a messaging system, the message flow having processing nodes for processing the message and wherein at least part of the message has been parsed into a logical representation accessible by processing nodes in the message flow and wherein context information used by the message flow to process the message has been converted into a logical representation accessible by at least one processing node in the message flow, the method comprising the steps of: receiving at the parser a request to perform an operation associated with the message, the message having been processed by at least part of the message flow; and ignoring the logical representation of context information associated with the processing of said message, said logical representation of the context information co-existing with the logical representation of a least part of that message.

According to another aspect, there is provided a parser for handling context information associated with a message flow in a messaging system, the message flow having processing nodes for processing the message and wherein at least part of the message has been parsed into a logical representation accessible by processing nodes in the message flow and wherein context information used by the message flow to process the message has been converted into a logical representation accessible by at least one processing node in the message flow, the parser comprising: means for receiving at the parser a request to perform an operation associated with the message, the message having been processed by at least part of the message flow; and means for ignoring the logical representation of context information associated with the processing of said message, said logical representation of the context information co-existing with the logical representation of a least part of that message.

According to another aspect there is provided a messaging system comprising: a queue for receiving a message; a message flow having processing nodes for processing the received message; a parser for handling context information associated with the message flow and wherein at least part of the message has been parsed into a logical representation accessible by processing nodes in the message flow and wherein context information used by the message flow to process the message has been converted into a logical representation accessible by at least one processing node in the message flow; and means for invoking the parser, the parser comprising: means for receiving at the parser a request to perform an operation associated with the message, the message having been processed by at least part of the message flow; and means for ignoring the logical representation of context information associated with the processing of said message, said logical representation of the context information co-existing with the logical representation of a least part of that message.

It will of course be appreciated that the present invention may also be implemented as a computer program or as a computer program product stored on a computer readable medium.

BRIEF DESCRIPTION OF THE DRAWINGS

A preferred embodiment of the present invention will now be described, by way of example only, and with reference to the following drawings, wherein.

DETAILED DESCRIPTION

The present invention, in accordance with a preferred embodiment, permits the access of context information in a message processing environment, whilst not suffering from disadvantages present in prior art solutions.

A message is received by a messaging system which typically comprises a plurality of parts. Each part is preferably processed by a different parser in order to turn the physical representation of the particular message part into a logical representation.

The present invention, in accordance with a preferred embodiment, introduces a new type of parser such that the message flow is not modified in order that context information can be retrieved. Further, in accordance with the preferred embodiment, a received message is not augmented with context information.

The operation of this new parser will be described with reference to FIGS. 4*a*, 4*b* and 4*c*.

Figure 4A:
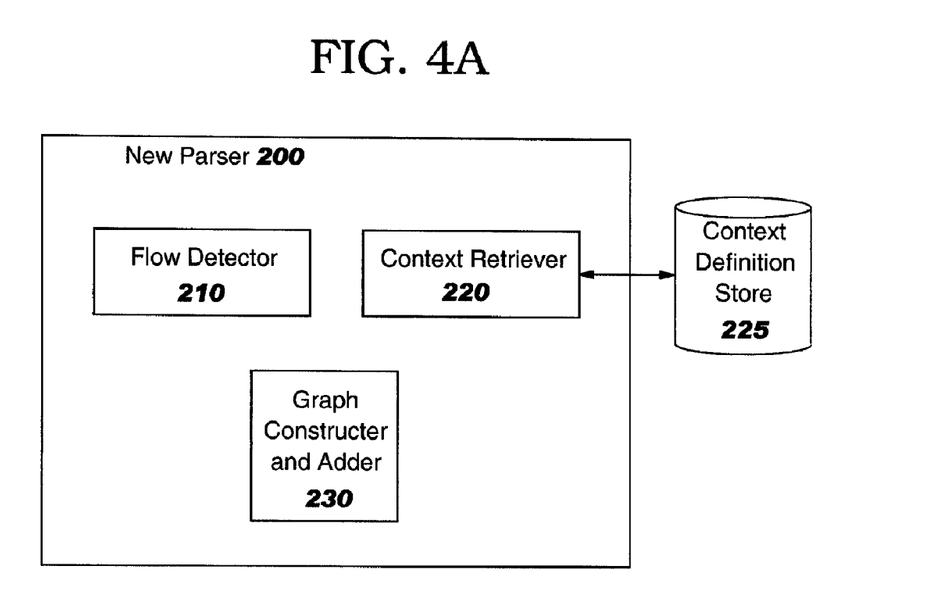
FIG. 4 provides an overview of the operation of the present invention, in accordance with a preferred embodiment.
Figure 4B:
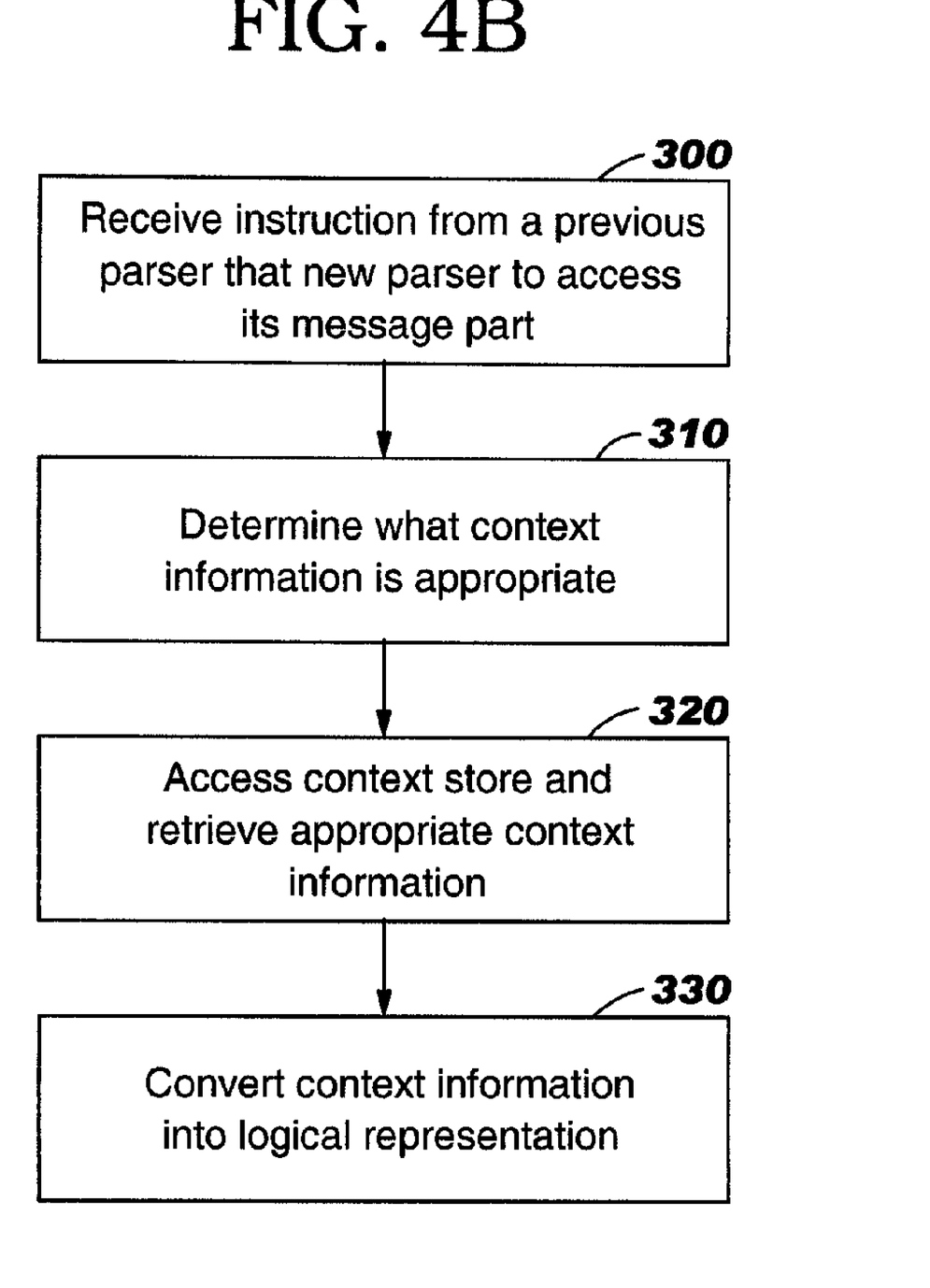

With reference first to FIGS. 4*a* and 4*b*, an instruction is received from a previous parser that the new parser 200 is to access the message part for which it is responsible (step 300). In reality, the new parser is not actually responsible for a physical message part. Rather the new parser deals with context information. Such context information may comprise, for example, configuration information, directory information, currency exchange rates etc.—in other words, information that is required by a message flow to influence its processing.

In accordance with the preferred embodiment, the new parser determines what context information is appropriate for the particular message flow (step 310). This is done by flow detector 210 which detects which message flow (e.g. the name of the message flow) is processing the message in question in order that context retriever 220 can access context definition store 225 to retrieve context information associated with that particular message flow (step 320). The context information is categorised in the context definition store according to message flow name.

Graph constructor and adder component 230 then converts the retrieved context information into a logical representation (step 330). Note, the conversion of the context information into a logical representation will not be described in detail herein. This is because such processing is already well known in the art.

The use of the message flow name to access the appropriate context information from the context definition store is not the only option. For example, in an alternative embodiment, the contents of the message are used to provide a pointer to the appropriate context information in the context definition store. For example, a message may have two header parts and a body. A header 1 parser parses the first header part of the message, a header 2 parser parses the second header part of the message and a body parser parses the body part of the message. Further the new parser is invoked by the header 1 parser and accesses the second header part to extract the pointer (e.g. to extract the name of a department) and then uses this to access the context definition store and to retrieve the appropriate context information. The header 2 parser then also accesses the second header part in order to convert the information found in this second header part into its logical representation.

Figure 4C:
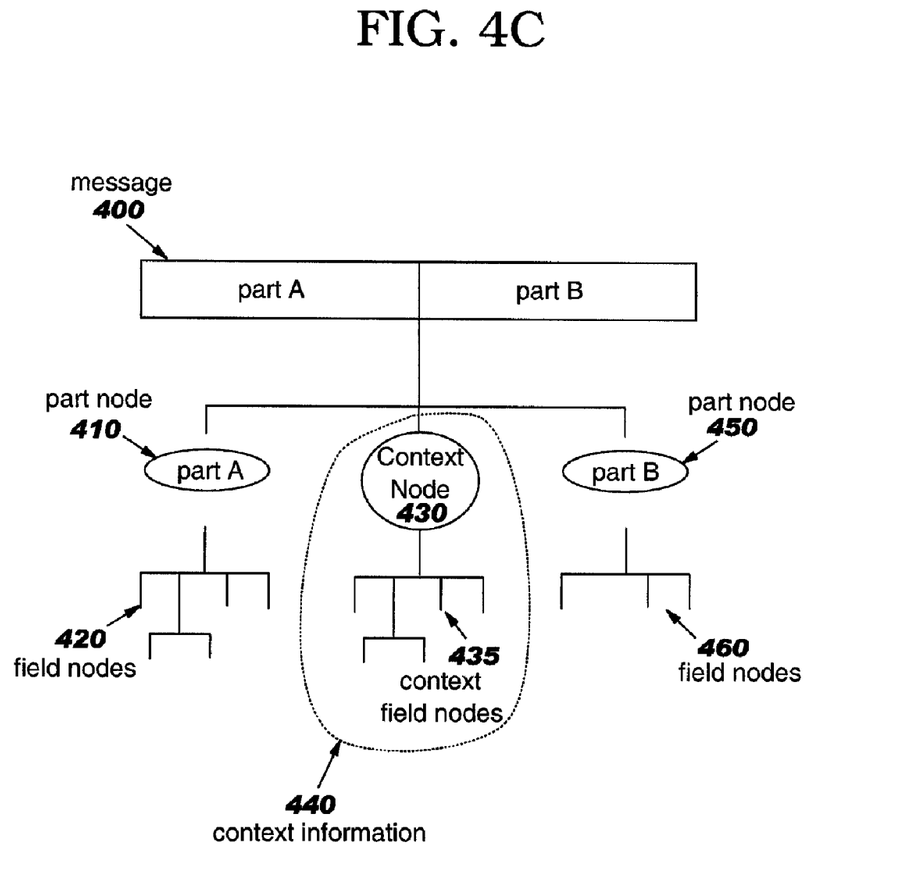

FIG. 4*c* shows a logical representation of a complete message, in accordance with a preferred embodiment.

Message 400 has two parts (A and B). One parser (parser A—not shown) is responsible for converting part A into its logical representation (see part nodes 410 and field nodes 420). Another parser (parser B—not shown) is responsible for converting part B into its logical representation (see part node 450, field nodes 460). The new parser 200 is instructed by, for example, parser A to access its message part. As previously discussed, the new parser does not deal with an "actual" message part. Rather the new parser accesses and converts context information into a logical (e.g. tree) representation. This is preferably added into the existing logical representation—see context information 440 including context node 430 and context field nodes 435.

The context information may be entered as a root node(s) or may be added to a pre-existing branch (as in prior art solution 2 above—see FIG. 3). Each part may be represented by a separate logical structure or that the context information may be represented as a logical structure separate from the logical structure representing the message itself. Many variations are indeed possible.

Figure 5A:
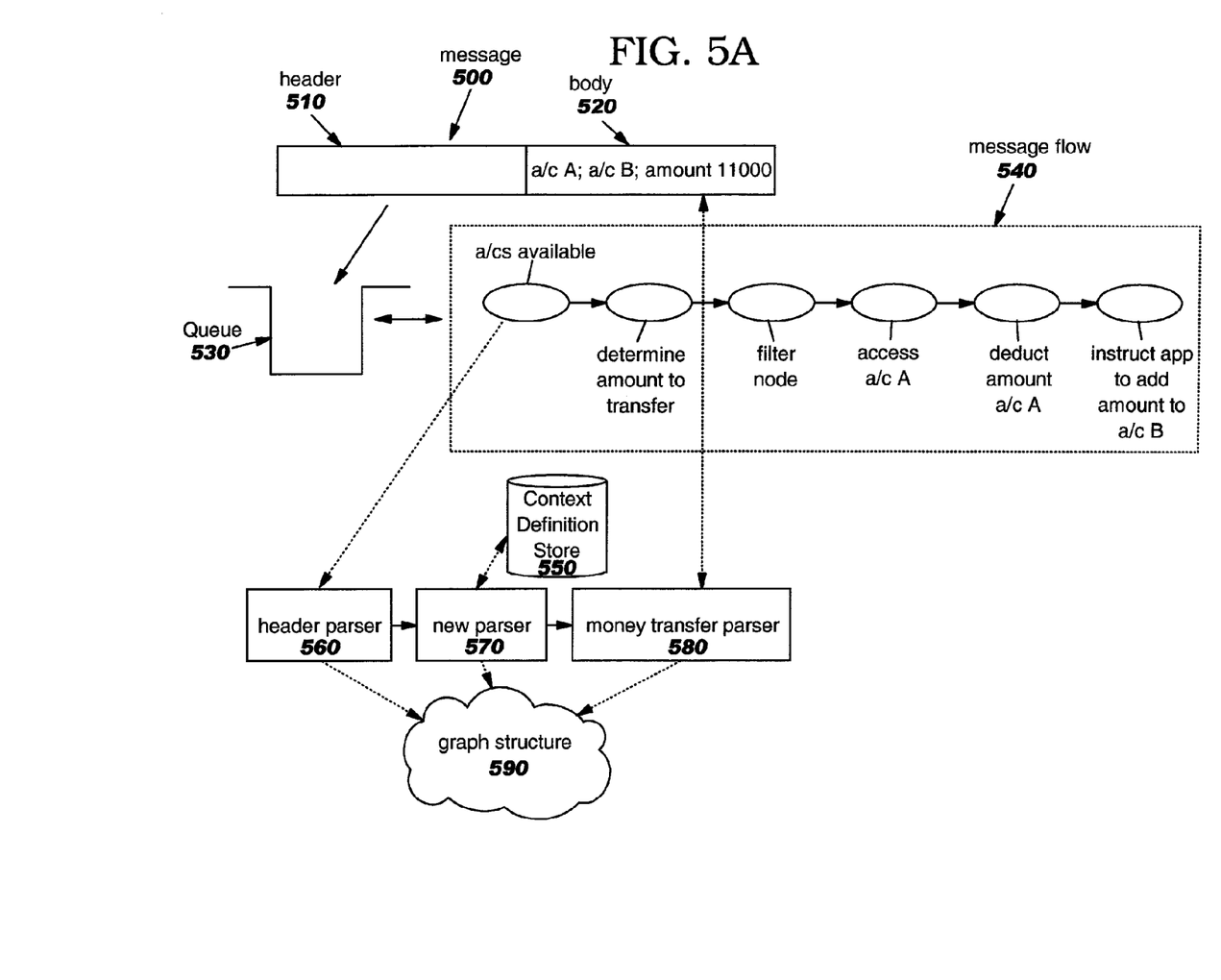
FIG. 5 provides a specific example of the operation of the present invention, in accordance with a preferred embodiment.
Figure 5B:
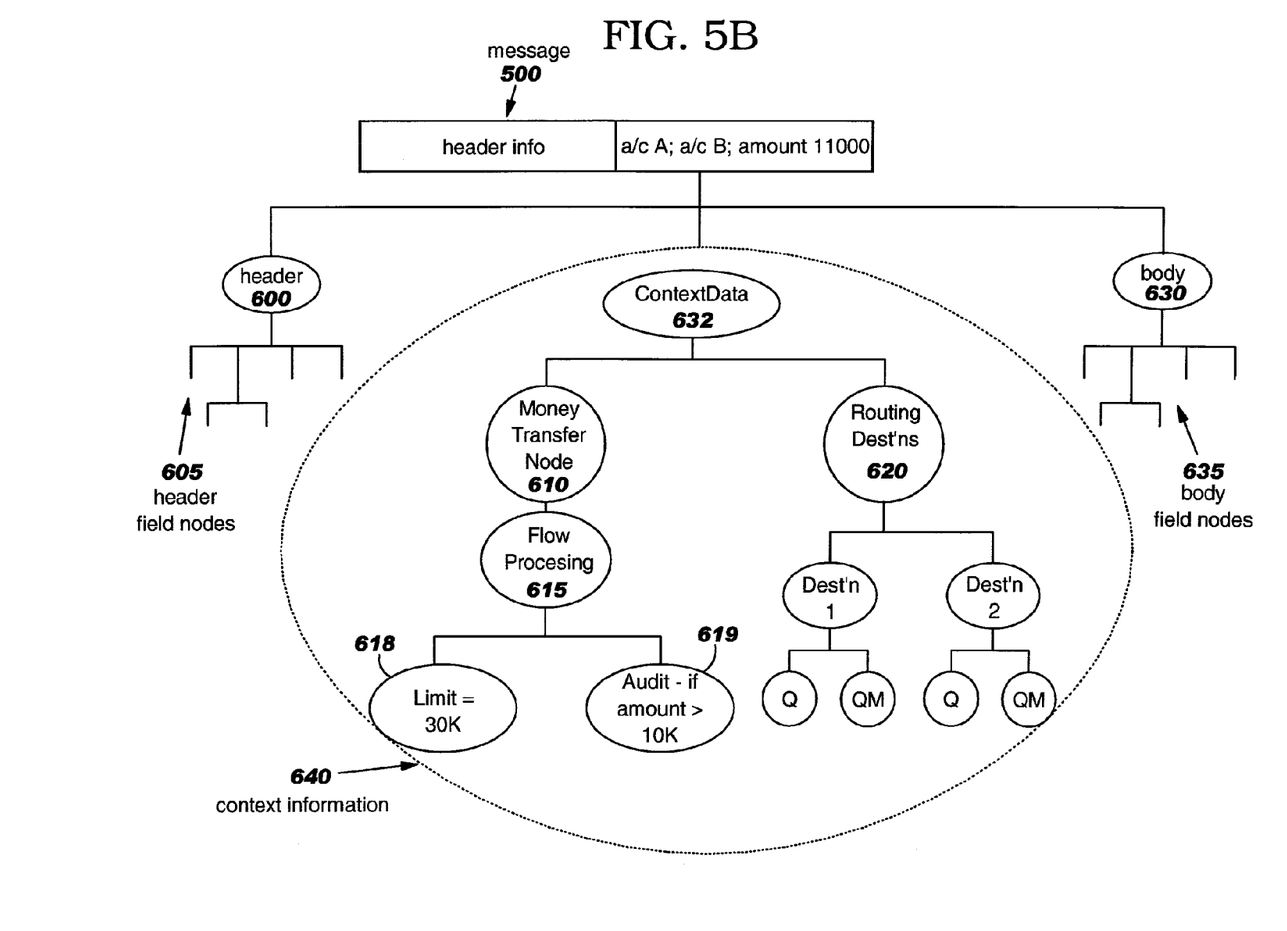

With reference to FIGS. 5*a* and 5*b*, a specific example of operation of the present invention is provided.

A message 500 is received at a messaging system and includes a header 510 and a body 520. The body 520 includes information requesting that 11000 euros is transferred from account A to account B.

The message is placed on queue 530 which is being accessed by a message flow 540 (a money transfer message flow). The message flow 540 includes a number of nodes which define the processing that takes place on message 500. For the sake of ease, the number of processing nodes has been much simplified.

A first node checks whether the first account specified in the received message is available. In order to do this, the node has to access the message itself. The node is unable to understand the physical representation of the received message and thus a parsing process is invoked, starting with a header parser.

The header parser 560 is responsible for accessing and converting the header part 510 of the message 500 into its logical representation (e.g. graph structure) 590. The logical representation is depicted (at a high-level) in FIG. 5*b*, as header node 600 and header field nodes 605.

The header parser then invokes the new parser. The new parser accesses a context definition store 550 to retrieve context information associated with message flow 540. Such information may be stored in a flat file in tabular format, with information being categorised therein by flow type. In this example, the information associated with the money transfer message flow includes context information which relates to the transfer amount (for example the context information could include a limit on the allowable transfer amount and an amount over which the transaction must be audited) and also routing information.

Such information is retrieved, converted by the new parser into a logical representation and then added into the graph structure 590 under the node ContextData 632. A money transfer node which depends from the ContextData node is created 610, from which depends a flow processing node 615. The children of the flow processing node 615 are a limit node 618 specified as 30000 euros) and an audit node 619 specifying an audit for amounts over 10000 euros.

A routing destinations node 620 (depending from the ContextData node 632) is also added into the graph structure. This has two children destination (dest'n) 1 and destination 2. Destination 1 node also has two children, Q (queue) and QM (queue manager). Destination 2 node has similar children Q and QM.

Once the new parser has converted all relevant context information into a logical representation, it invokes a body (money transfer) parser 580. The body parser is responsible for converting the physical representation of message 500's body into a logical representation and for adding it into the existing graph structure 590. The logical representation is depicted (at a high-level) in FIG. 5*b*, as body node 630 and body field nodes 635.

Now that the message is present (in memory) in a logical format, it is accessible by message flow 540.

The afore-mentioned first processing node in the message flow 540 accesses the logical representation, (namely the body node 630 and its children) to determine that it is required to transfer money from account A to account B. The body node 630 is further accessed to determine that transferral amount (11000 euros).

A filter node then accesses the context information part 640 of graph structure 590. This information is used to have an additional influence on the processing of the message. From limit node 618 the message flow determines that transfers over 30000 euros are not allowable—message 500 passes this test since the transfer is only for 11000 euros. From audit node 619, the message flow determines that transfers over 10000 euros must be audited—message 500 fails this test and thus, in line with the rule specified, an audit must be initiated. The processing nodes which achieve this are not, for the sake of simplicity, depicted within FIG. 5*a*; rather, it is assumed that the filter node encompasses all of the relevant processing.

In order to initiate an audit, routing destinations node 620 is accessed in graph structure 590. According to a rule in the filter node of the message flow 540, amounts of between 10000 and 20000 euros are to be audited by destination 1. Thus the transaction has (in accordance with the context information) to be authorised by an application processing messages off queue 1, before it can be actioned.

Once actioned, a processing node initiates the deduction of 11000 euros from account A and another processing node creates a new message instructing a remote application to add 11000 euros to account B. Accordingly processing of the message is complete.

Note in other situations, the same message may be forwarded on (i.e. without modification). In which case, each parser is responsible for streaming its message part back from the logical representation to the physical representation.

Figure 6:
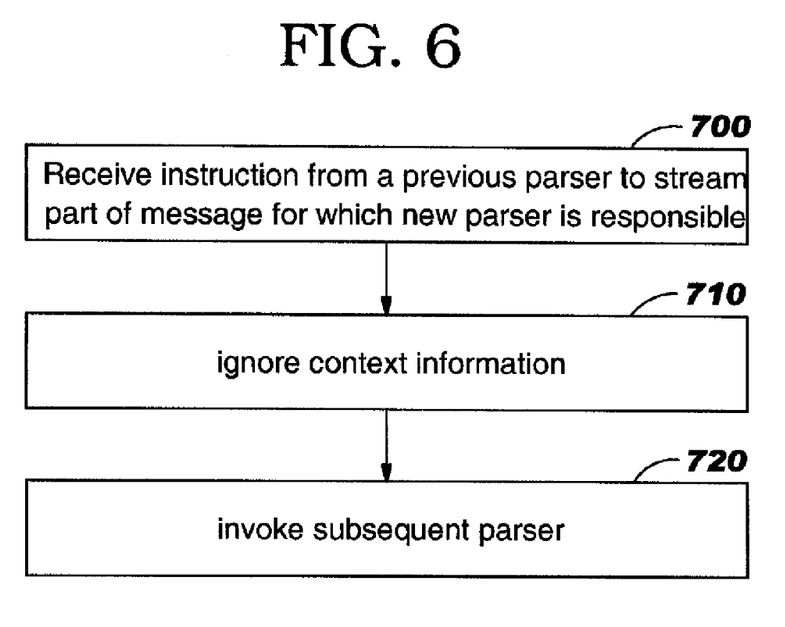
FIG. 6 illustrates, in accordance with a preferred embodiment, the operation of a new parser when requested to stream its message part into a physical form.

FIG. 6 shows, in accordance with a preferred embodiment, the processing of the new parser in this process. The new parser receives a request at step 700 to stream the part of the message for which it is responsible—in other words to reconstruct the logical form of its message part into a physical representation (form). The new parser however ignores the context information for which it is responsible (step 710) and invokes a subsequent parser, if such a parser exists—step 720.

In some situations, the values in the logical representation may be modified by processing nodes in a message flow. The processing of the preferred embodiment does not however change—the context information must still be ignored (i.e. not used to augment the message).

Note, if a completely new message is forwarded on, as in the example above, then there should be no context information associated with this new message. Thus there is no context information to ignore. In this case the new parser is not invoked.

Thus the original/modified message is not augmented with the context information and the context information is available for all processing nodes in a messaging flow.

In some embodiments, the logical form of the context information is provided as "read only." If the information is not "read only," then it is advisable to keep a check (to verify) on the context information in order to be able to detect if it is, perhaps unintentionally, modified. Such a check could be made before the message is reconstructed and sent on. The values in the logical form are preferably compared with values in a physical form stored in non-volatile memory and if the two do not match, then an exception (error) is thrown up. The physical form of the context information is stored in non-volatile memory first before it is converted to its logical form in volatile memory. This informs the administrator that there is a problem with the message flow, e.g. that the message flow is modifying the context information. The message flow is then preferably corrected and the message re-processed.

Whilst the present invention has been described in terms of separate parsers, it will be appreciated that one parser could be employed having multiple modules, parsers, each being responsible for a different part of a message, and the like.

By logical representation, it is meant that information is not accessed directly from the physical message, e.g. by calculating an offset within this physical message and accessing the relevant information directly from a context store. Instead an abstract name is preferably used to identify a particular item in the message in the context store. The logical representation can vary depending on the kind of information that is accessed, e.g. in the form of a list, a tree or any other representation that is appropriate.

What is claimed is:

1. A method for a parser to handle context information associated with a message flow in a messaging system, a message flow having processing nodes for processing the message, the method comprising:
- receiving at the parser a request to perform a first operation associated with the message;
- obtaining an indication of the context information to be retrived from a context store, said context information for use by at least one of the processing nodes in the message flow for determining how to process the message;
- retrieving the context information from the context store; and
- creating a logical representation of the context information in a format accessible by at least one processing node in the message flow;
- wherein the context information is in a format accessible by any processing node in the message flow;
- wherein at least a part of the message has also been parsed into a logical representation accessible by processing nodes in the message flow, the method further comprising the step of:
- receiving at the parser a request to perform a second operation associated with the message, the message having been processed by at least part of the message flow; and
- ignoring the logical representation of context information associated with the processing of said message, said logical representation of the context information co-existing with the logical representation of a least part of that message.

2. The method of claim 1, wherein the step of obtaining an indication of the context information to retrieve comprises:
- determining which message flow is processing the message, and wherein the step of retrieving the context information uses an identifier associated with the determined message flow, to retrieve the appropriate context information.

3. The method of claim 1, wherein the step obtaining an indication of the context information to retrieve comprises:
- accessing at least a part of the message, and wherein the step of retrieving the context information uses information obtained via accessing the message.

4. The method of claim 1, wherein the logical representation of the context information is added into the logical representation representing at least a part of the message.

5. A method for a parser to handle context information associated with a message flow in a messaging system, the message flow having processing nodes for processing a message, the method comprising:
- receiving at the parser a request to perform a first operation associated with the message;
- obtaining an indication of the context information to be retrived from a context store, said context information for use by at least one of the processing nodes in the message flow for determining how to process the message;
- retrieving the context information from the context store; and
- creating a logical representation of the context information in a format accessible by at least one processing node in the message flow;
- verifying that the context information is consistent with another copy of the context information.

6. The method of claim 5, further comprising the step of, responsive to determining that the context information is not consistent, reporting an error.

7. A method for a parser to handle context information associated with a message flow in a messaging system, the message flow having processing nodes for processing the message and wherein at least part of the message has been parsed into a logical representation accessible by processing nodes in the message flow and wherein context information used by the message flow to process the message has been converted into a logical representation accessible by at least one processing node in the message flow, the method comprising the steps of:
- receiving at the parser a request to perform an operation associated with the message, the message having been processed by at least part of the message flow; and
- ignoring the logical representation of context information associated with the processing of said message, said logical representation of the context information co-existing with the logical representation of a least part of that message.

* * * * *